United States Patent
Jones et al.

(10) Patent No.: US 6,996,518 B2
(45) Date of Patent: Feb. 7, 2006

(54) METHOD AND APPARATUS FOR AUTOMATED MEASUREMENT OF QUALITY FOR MACHINE TRANSLATION

(75) Inventors: Carol Ann Jones, Raleigh, NC (US); Dennis D. King, Cary, NC (US); Christopher Herbert Langlois Wicher, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 09/753,988

(22) Filed: Jan. 3, 2001

(65) Prior Publication Data

US 2002/0087301 A1 Jul. 4, 2002

(51) Int. Cl.
*G10L 15/00* (2006.01)
(52) U.S. Cl. .............. 704/8; 704/2; 434/157
(58) Field of Classification Search ............ 704/2, 704/8; 434/157
See application file for complete search history.

(56) References Cited

U.S. PATENT DOCUMENTS

| | | | |
|---|---|---|---|
| 4,604,698 A | 8/1986 | Ikemoto et al. | 364/419 |
| 5,029,085 A | 7/1991 | Ito | 364/419 |
| 5,408,410 A | 4/1995 | Kaji | 364/419.02 |
| 5,486,111 A * | 1/1996 | Watkins | 434/157 |
| 5,541,837 A | 7/1996 | Fushimoto | 364/419.02 |
| 5,812,818 A * | 9/1998 | Adler et al. | 703/23 |
| 5,867,811 A | 2/1999 | O'Donoghue | 704/1 |
| 5,991,710 A | 11/1999 | Papineni et al. | 704/2 |
| 6,278,969 B1 * | 8/2001 | King et al. | 704/7 |

FOREIGN PATENT DOCUMENTS

| | | |
|---|---|---|
| EP | 0 926 604 A2 | 6/1999 |
| JP | 8087507 | 2/1996 |

* cited by examiner

*Primary Examiner*—Daniel Abebe
(74) *Attorney, Agent, or Firm*—Yee & Associates, P.C.; A. Bruce Clay

(57) ABSTRACT

A machine translation quality determination mechanism uses comparisons of subsequent and potentially numerous reverse translations of a translated human language back to the source language. The process of translating from source language to target language to source language may iterate many times to ultimately yield information as to an assertion of low quality translation. Thus, the present invention continuously iterates this "back-and-forth" translation until the resulting source human language text is not reasonably equivalent to the original source human language or until the process iterates a predetermined number of times. If the back-and-forth translation results in a source human language text that is not reasonably equivalent to the original source text, then the translation is identified as low quality.

20 Claims, 3 Drawing Sheets

METHOD AND APPARATUS FOR AUTOMATED MEASUREMENT OF QUALITY FOR MACHINE TRANSLATION

BACKGROUND OF THE INVENTION

1. Technical Field

The present invention relates to machine translation and, in particular, to a method, apparatus, and program for measurement of quality for machine translation.

2. Description of Related Art

Machine Translation (MT) is a computer technology wherein a computer software program or computer hardware translates a textual source human language "x" (SHLx) into some textual target human language "y" (THLy). An example is translation from English to German. For clarity, the notation of "THLy=MT$_{xy}$(SHLx)" is used to represent translation from language x to language y (Mt$_{xy}$) when applied against a source human language text in language x (SHLx) to result in a target or translated human language text in language y (THLy). In the example of translation from English to German, the notation is THLg=MT$_{eg}$ (SHLe).

This technology has been in research and development for decades and is just now emerging on a broad basis as practical and useful for commercial applications. One fundamental complexity with MT is how to yield a high intelligibility and accuracy of the THL. For simplicity, intelligibility and accuracy are termed "quality."

Measuring quality of THL is a complex problem in MT as well as translation by a person. This is because, for any particular set of SHL, there may be an infinite set of valid THL. A common approach to measurement of quality is through manual human testing and analysis. This testing and analysis is costly and subjective.

Software techniques are used to determine quality of THL; however, these techniques use internal mechanisms during the various phases of MT to accumulate a "guess" as to the resulting quality. Data points from parsing, disambiguation, transfer and overall knowledge as to an MT system's capabilities with respect to under generation, over generation, and brittleness can yield insight as to a quality assertion. This assertion may be at a sentence level and ultimately modeled to larger units such as a page of text. However, it would be advantageous to provide a method, apparatus, and program for validating low quality translated human language.

SUMMARY OF THE INVENTION

The present invention uses comparisons of subsequent and potentially numerous reverse translations of a translated human language back to the source language. The process of translating from source language to target language to source language may iterate many times to ultimately yield information as to an assertion of low quality translation. Thus, the present invention continuously iterates this "back-and-forth" translation until the resulting source human language text is not reasonably equivalent to the original source human language or until the process iterates a predetermined number of times. If the back-and-forth translation results in a source human language text that is not reasonably equivalent to the original source text, then the translation or target language text is identified as low quality. If the predetermined number of iterations is reached, then the test is inconclusive and no determination of quality can be made.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
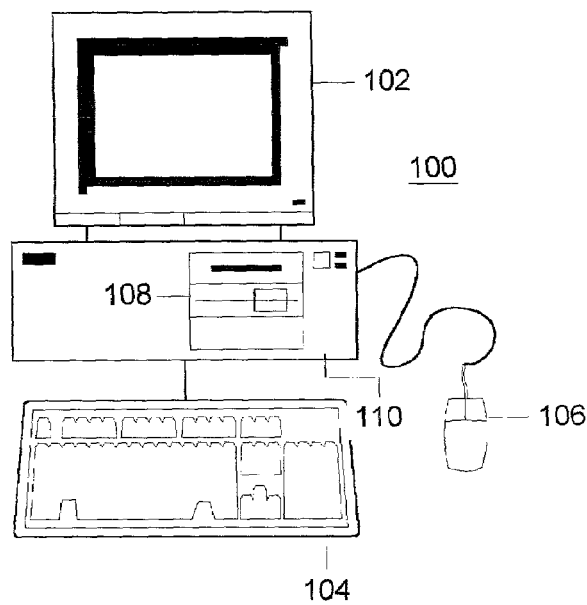
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
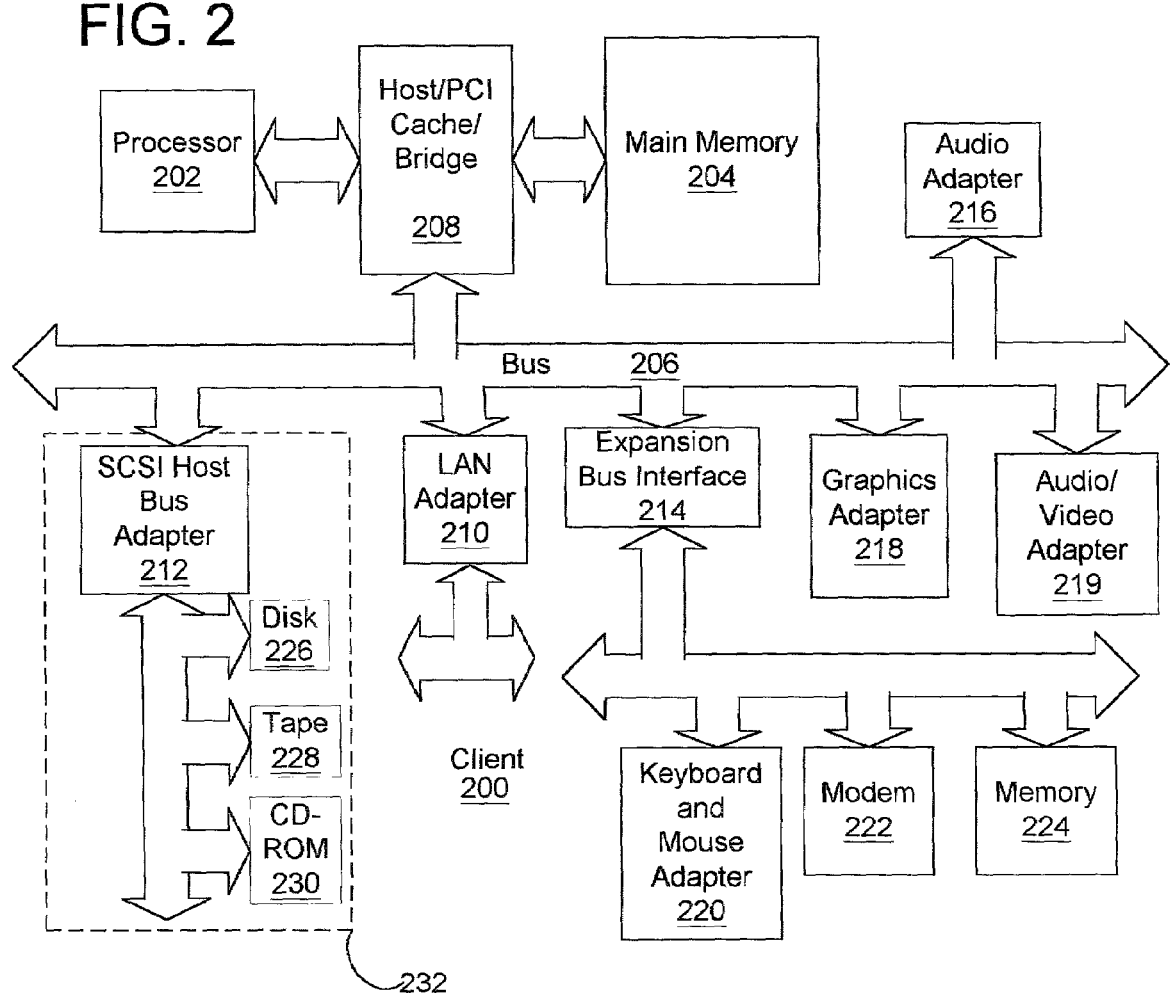
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and 20 audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230. The processes performed by processor 202 include the low quality translation determination process of the present invention and may also include the machine translation processes.

Figure 3:
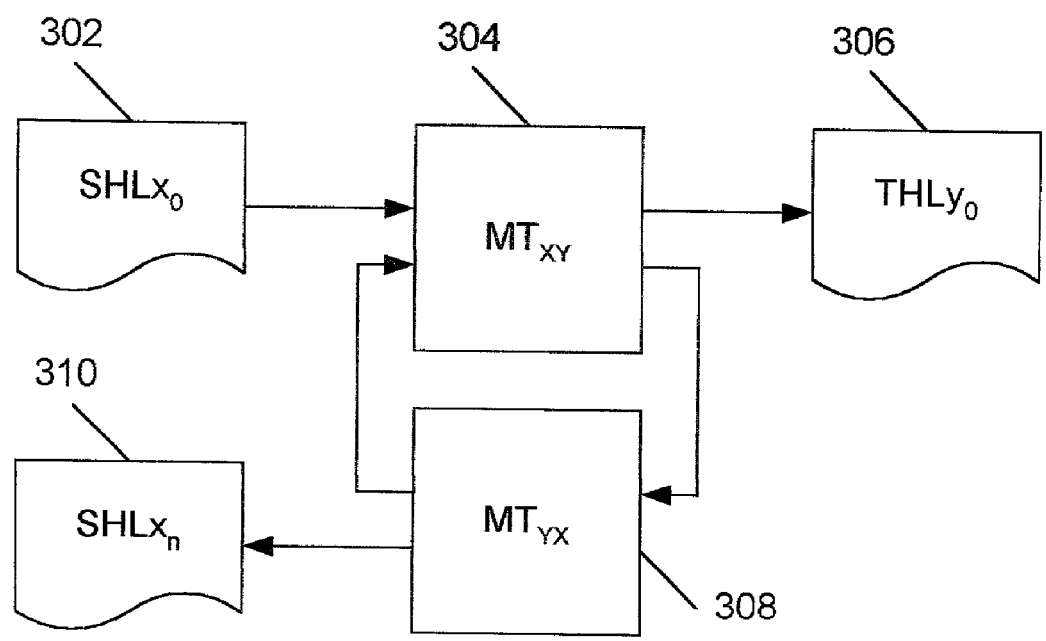
FIG. 3 is a block diagram of a machine translation system in accordance with a preferred embodiment of the present invention.

With reference to FIG. 3, a block diagram of a machine translation system is illustrated in accordance with a preferred embodiment of the present invention. Source human language text in language x (SHLx$_0$) 302 is translated by x-to-y machine translation (MT$_{xy}$) module 304 into language y, resulting in target human language text in language y (THLy$_0$) 306. The quality of MT is difficult to measure, because a set of translated text could be 99.9% accurately translated and that 0.1% may change the fundamental meaning of the entire content.

The present invention has at its roots some concepts from Chaos Theory and, in particular, the phenomenon known as sensitive dependence on initial conditions, also known as the "Butterfly Effect." According to this concept, a tiny change in state, over time, may diverge into a much larger event. For example, a flapping of a butterfly's wings produces a slight change in the atmosphere that, over time and distance, may result in a tornado. Given the example of 99.9% accurately translated text, the minor error or inaccuracy may result in significant downstream chaos.

Thus, the present invention operates on the fundamental premise that 100% quality MT could be defined as SHLx$_0$<=>SHLx$_n$, where SHLx$_0$ is an original textual source human language in some language x and SHLx$_n$ is created as a result of re-translation between language x and language y a number (n) of times. The symbol "<=>" is used as notation to describe "reasonable equivalence." It could also be referred to as "non-divergence." Note that this use is different from the strict mathematical use of this symbol to mean equivalence, wherein equivalence means exactly equal and often identical. Reasonable equivalence in the context of this invention is variable, yet it does imply some degree of the traditional definition of equivalence.

Since the present invention is directed to MT, depending on the application of the invention, examples of reasonable equivalence between two sets of language source may be the following:

Sets of language source are similar in size within some threshold.

Sets of language source contain the same number of words within some threshold.

Sets of language source contain the same set of keywords within some threshold.

Sets of language source generate the same Translation Confidence Indices within some threshold.

Translation Confidence is an internal mechanism in software techniques for determining quality. The above examples are for explanation and illustration. A person of ordinary skill in the art will recognize that many other such tests for reasonable equivalence may be used, including combinations of the above. Furthermore, the test for reasonable equivalence may be dependent upon the languages used in translation.

In accordance with a preferred embodiment of the present invention, source human language text SHLx$_i$ is continuously translated into language y to form THLy$_i$ using MT$_{xy}$ 304, which in turn is retranslated into SHLy$_{i+1}$ using MT$_{yx}$ 308 and so on. In other words, the output of Mt$_{yx}$ is continuously fed into MT$_{xy}$ and the output of MT$_{xy}$ is fed back into MT$_{yx}$ as long as SHLx$_0$<=>SHLx$_i$, where i is a counter controlling the iteration, and as long as i does not reach an iteration threshold n. If i reaches n, then the resulting translation is SHLx$_n$ 310. If SHLx$_0$<=>SHLx$_n$, then a determination of low quality translation cannot be made. If, however, any SHLx$_i$ is not reasonably equivalent to SHLx$_0$ before the iteration threshold is reached, then the MT is likely of low quality.

Figure 4:
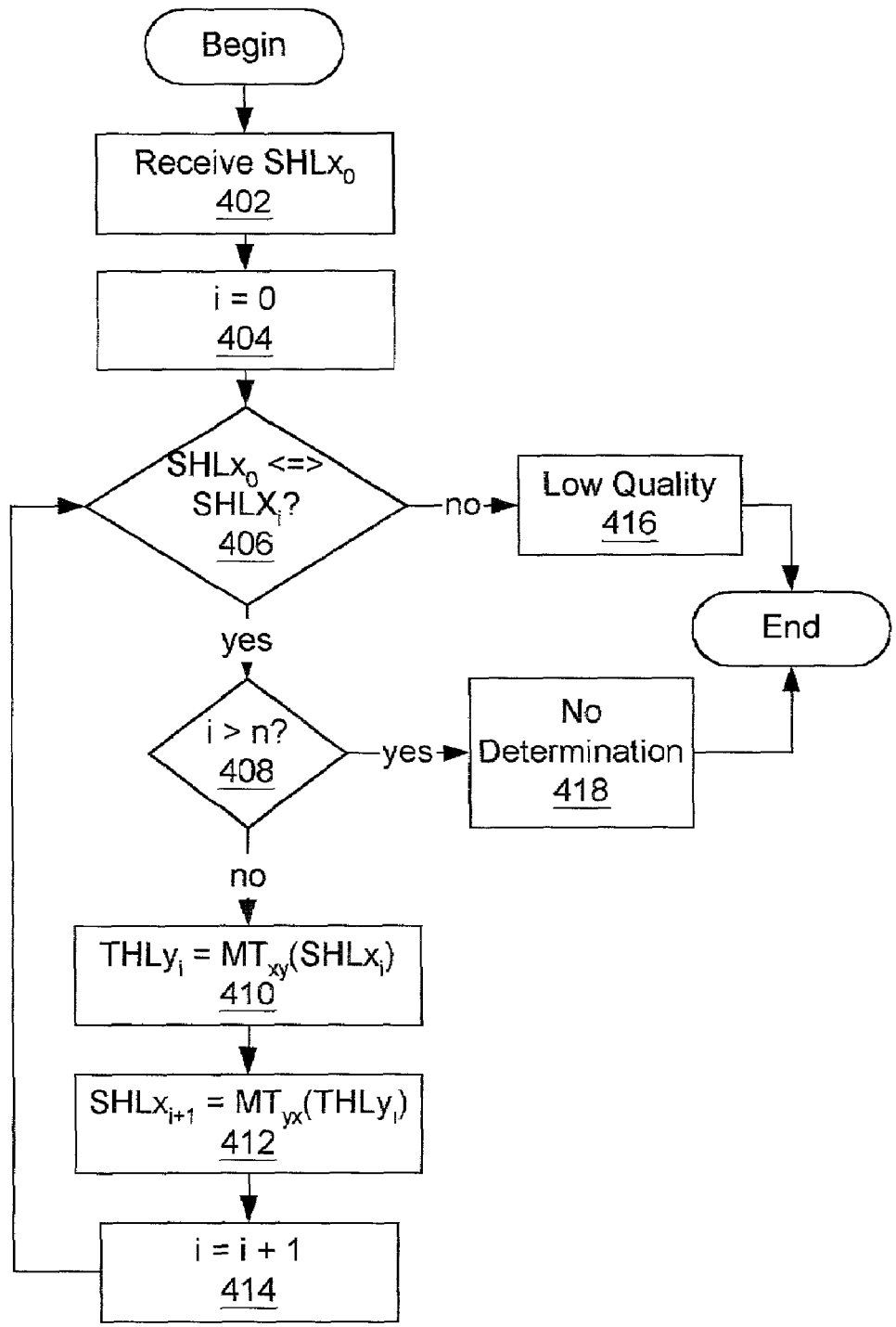
FIG. 4 is a flowchart of the operation of the translation quality determination process in accordance with a preferred embodiment of the present invention.

Turning now to FIG. 4, a flowchart of the operation of the translation quality determination process is shown in accordance with a preferred embodiment of the present invention.

The process begins and receives an original source human language text $SHLx_0$ (step 402). An iteration counter "i" is initialized to zero (step 404) and a determination is made as to whether $SHLx_0 <=> SHLx_i$ (step 406). In the first iteration $SHLx_0 <=> SHLx_0$; however, in later iterations, step 406 is a test of reasonable equivalence or non-divergence. If $SHLx_0 <=> SHLx_i$, then a determination is made as to whether i>n (step 408).

If i is less than or equal to n, the process performs $MT_{xy}$ on $SHLx_i$ to form $THLy_i$ (step 410) and performs $MT_{yx}$ on $THLy_i$ to form $SHLx_{i+1}$ (step 412). Translation and retranslation may be performed by software in the same or a different computer or by a specialized hardware translation device. Next, the process increments the counter and returns to step 406 to determine whether $SHLx_0 <=> SHLx_i$.

Returning to step 406, if $SHLx_i$ is not reasonably equivalent to $SHLx_0$, then the process identifies the MT as low quality (step 416) and ends. If the iteration threshold is reached in step 408, then the process makes no determination of quality (step 418) and ends. If not determination of quality is made, the process may repeat with a different condition of reasonable equivalence.

Thus, the present invention solves the disadvantages of the prior art by providing a machine translation quality determination mechanism that uses comparisons of subsequent and potentially numerous reverse translations of a translated human language back to the source language. The process of translating from source language to target language to source language may iterate many times to ultimately yield information as to an assertion of low quality translation. Therefore, the present invention detects very minor inaccuracies that may diverge and significantly effect the fundamental meaning of the entire content. The present invention also provides an automated measurement of quality without employing costly and subjective human testing and analysis.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for measuring quality of machine translation, comprising:
   receiving an original source language text;
   repeatedly translating and retranslating the original source language text between the source language and a target language while a current source language text is reasonably equivalent to the original source language text and an iteration threshold is not reached; and
   identifying the translation as low quality if the current source language text is not reasonably equivalent to the original source language text.

2. The method of claim 1, wherein translation and retranslation are performed by a translation software program.

3. The method of claim 1, wherein translation and retranslation are performed by a hardware translation device.

4. A method for measuring quality of machine translation, comprising:
   a) receiving an original source language text $SHLx_0$;
   b) setting a counter i to zero;
   c) performing machine translation on source language text $SHLx_i$ to form target language text $THLy_i$;
   d) performing machine translation on target language text $THLy_i$ to form source language text $SHLx_{i+1}$;
   e) increment i by one;
   f) determining whether $SHLx_i$ is reasonably equivalent to $SHLx_0$; and
   g) repeat steps (c) through (f) until $SHLx_i$ is not reasonably equivalent to $SHLx_0$ or until i reaches an iteration threshold.

5. The method of claim 4, further comprising:
   g) identifying the target language text as low quality if a source language text $SHLx_i$ is not reasonably equivalent to the original source language text.

6. The method of claim 4, wherein $SHLx_i$ is reasonably equivalent to $SHLx_0$ if $SHLx_i$ is similar in size within a given threshold to $SHLx_0$.

7. The method of claim 4, wherein $SHLx_i$ is reasonably equivalent to $SHLx_0$ if $SHLx_i$ contains the same number of words as $SHLx_0$ within a given threshold.

8. The method of claim 4, wherein $SHLx_i$ is reasonably equivalent to $SHLx_0$ if $SHLx_i$ contain the same set of keywords as $SHLx_0$ within a given threshold.

9. A method for measuring quality of machine translation, comprising:
   a) receiving an original source language text $SHLx_0$;
   b) setting a counter i to zero;
   c) performing machine translation on source language text $SHLx_i$ to form target language text $THLy_i$;
   d) performing machine translation on target language text $THLy_i$ to form source language text $SHLx_{i+1}$;
   e) increment i by one; and
   f) repeat steps (c) through (e) until $SHLx_i$ is not reasonably equivalent to $SHLx_0$ or until i reaches an iteration threshold, wherein $SHLx_i$ is reasonably equivalent to $SHLx_0$ if $SHLx_i$ generates the same Translation Confidence Indices as $SHLx_0$ within a given threshold.

10. An apparatus for measuring quality of machine translation, comprising:
    receipt means for receiving an original source language text;
    translation means for repeatedly translating and retranslating the original source language text between the source language and a target language while a current source language text is reasonably equivalent to the original source language text and an iteration threshold is not reached; and
    identification means for identifying the translation as low quality if the current source language text is not reasonably equivalent to the original source language text.

11. The apparatus of claim 10, wherein the translation means comprises a translation software program.

12. The apparatus of claim 10, wherein the translation means comprises a hardware translation device.

13. An apparatus for measuring quality of machine translation, comprising:

a processor; and a memory having stored therein a program for execution by the processor to perform the following steps:

a) receiving an original source language text $SHLx_0$;

b) setting a counter i to zero;

c) performing machine translation on source language text $SHLX_i$ to form target language text $THLy_i$;

d) performing machine translation on target language text $THLy_i$ to form source language text $SHLx_{i+1}$;

e) increment i by one;

f) determining whether $SHLx_i$ is reasonably equivalent to $SHLx_0$; and g) repeat steps (c) through (f) until $SHLx_i$ is not reasonably equivalent to $SHLx_0$ or until i reaches an iteration threshold.

14. The apparatus of claim 13, wherein the target language text is identified as low quality if a source language text $SHLx_i$ is not reasonably equivalent to the original source language text.

15. The apparatus of claim 13, wherein $SHLx_i$ is reasonably equivalent to $SHLx_0$ if $SHLx_i$ is similar in size within a given threshold to $SHLx_0$.

16. The apparatus of claim 13, wherein $SHLx_i$ is reasonably equivalent to $SHLx_0$ if $SHLx_i$ contains the same number of words as $SHLx_0$ within a given threshold.

17. The apparatus of claim 13, wherein $SHLx_i$ is reasonably equivalent to $SHLx_0$ if $SHLx_i$ contain the same set of keywords as $SHLx_0$ within a given threshold.

18. An apparatus for measuring quality of machine translation, comprising:

a processor; and a memory having stored therein a program for execution by the processor to perform the following steps:

a) receiving an original source language text $SHLx_0$;

b) setting a counter i to zero;

c) performing machine translation on source language text $SHLx_i$ to form target language text $THLy_i$;

d) performing machine translation on target language text $THLy_i$ to form source language text $SHLx_{i+1}$;

e) increment i by one: and f) repeat steps (c) through (e) until $SHLx_i$ is not reasonably equivalent to $SHLx_0$ or until i reaches an iteration threshold, wherein $SHLx_i$ is reasonably equivalent to $SHLx_0$ if $SHLx_i$ generates the same Translation Confidence Indices as $SHLx_0$ within a given threshold.

19. A computer program product, in a computer readable medium, for measuring quality of machine translation, comprising:

instructions for receiving an original source language text;

instructions for repeatedly translating and retranslating the original source language text between the source language and a target language while a current source language text is reasonably equivalent to the original source language text and an iteration threshold is not reached; and instructions for identifying the translation as low quality if the current source language text is not reasonably equivalent to the original source language text.

20. A computer program product, in a computer readable medium, including a program for execution by a computer to perform the following steps:

a) receiving an original source language text $SHLx_0$;

b) setting a counter i to zero;

c) performing machine translation on source language text $SHLx_i$ to form target language text $THLy_i$;

d) performing machine translation on target language text $THLy_i$ to form source language text $SHLx_{i+1}$;

e) increment i by one; and f) determining whether $SHLx_i$ is reasonably equivalent to $SHLx_0$; and g) repeat steps (c) through (f) until $SHLx_i$ is not reasonably equivalent to $SHLx_0$ or until i reaches an iteration threshold.

* * * * *